(12) United States Patent
Wang et al.

(10) Patent No.: US 11,971,211 B2
(45) Date of Patent: Apr. 30, 2024

(54) REFRIGERATING AND FREEZING DEVICE

(71) Applicants: QINGDAO HAIER SPECIAL REFRIGERATOR CO., LTD, Shandong (CN); QINGDAO HAIER REFRIGERATOR CO., LTD., Shandong (CN); HAIER SMART HOME CO., LTD., Shandong (CN)

(72) Inventors: Haijuan Wang, Qingdao (CN); Sen Mu, Qingdao (CN); Peng Li, Qingdao (CN); Kunkun Zhao, Qingdao (CN)

(73) Assignees: QINGDAO HAIER SPECIAL REFRIGERATOR CO., LTD, Qingdao (CN); QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 368 days.

(21) Appl. No.: 17/425,078

(22) PCT Filed: Jan. 20, 2020

(86) PCT No.: PCT/CN2020/073294
§ 371 (c)(1),
(2) Date: Jul. 22, 2021

(87) PCT Pub. No.: WO2020/156332
PCT Pub. Date: Aug. 6, 2020

(65) Prior Publication Data
US 2022/0107130 A1 Apr. 7, 2022

(30) Foreign Application Priority Data
Jan. 30, 2019 (CN) .......................... 201920166359.4

(51) Int. Cl.
| F25D 23/12 | (2006.01) |
| A23L 3/365 | (2006.01) |
| F25D 11/02 | (2006.01) |
| F25D 29/00 | (2006.01) |
| H05B 6/48 | (2006.01) |
| H05B 6/62 | (2006.01) |

(52) U.S. Cl.
CPC .............. *F25D 23/12* (2013.01); *A23L 3/365* (2013.01); *F25D 11/02* (2013.01); *F25D 29/005* (2013.01);
(Continued)

(58) Field of Classification Search
CPC ... A23L 3/365; F25D 2700/02; F25D 31/005; F25D 23/12; F25D 11/02; F25D 25/025;
(Continued)

(56) References Cited

U.S. PATENT DOCUMENTS

| 4,333,521 A | * | 6/1982 | Stottman .................. H05B 6/62 219/679 |
| 2018/0263401 A1 | * | 9/2018 | Kataoka .................. A47J 27/04 |

FOREIGN PATENT DOCUMENTS

| CN | 106288626 A | * | 1/2017 | ............... A23B 4/07 |
| CN | 106288626 A | | 1/2017 | |

(Continued)

OTHER PUBLICATIONS

Supplementary European Search Report for EP Application No. 20747812.4 dated Feb. 17, 2022 (4 pages).
(Continued)

*Primary Examiner* — Ana M Vazquez
(74) *Attorney, Agent, or Firm* — ALSTON & BIRD LLP

(57) ABSTRACT

A refrigerating and freezing device includes a cabinet defining at least one storage compartment, at least one cabinet door configured to respectively open and close the at least one storage compartment, a refrigerating system configured to provide cooling capacity to the at least one storage compartment, and a heating unit. The heating unit includes
(Continued)

a container body disposed in one storage compartment and provided with a pick-and-place opening, a door body configured to open and close the pick-and-place opening, an electromagnetic generating system configured to generate electromagnetic waves in the container body to heat an object to be processed and a cabinet door detection device configured to detect open and closed states of the cabinet door corresponding to the storage compartment provided with the container body; wherein the electromagnetic generating system stops generating electromagnetic waves when the corresponding cabinet door is in an open state.

7 Claims, 7 Drawing Sheets

(52) U.S. Cl.
CPC ................ *H05B 6/48* (2013.01); *H05B 6/62* (2013.01); *F25B 2600/01* (2013.01)

(58) Field of Classification Search
CPC ........... F25D 29/006; H05B 6/48; H05B 6/62; F25B 2600/01
See application file for complete search history.

(56) References Cited

FOREIGN PATENT DOCUMENTS

| CN | 106403482 A | 2/2017 |
|----|-------------|--------|
| CN | 109000400 A | 12/2018 |
| CN | 109000406 A | 12/2018 |
| CN | 109000419 A | 12/2018 |
| CN | 209893782 U | 1/2020 |
| JP | S62-147278 A | 7/1987 |
| JP | 07155154 A * | 6/1995 |
| JP | H07155154 A | 6/1995 |
| JP | 2002323279 A | 11/2002 |
| RU | 2473026 C2 | 1/2013 |
| RU | 2636946 C1 | 11/2017 |
| WO | WO 2003/075680 A1 | 9/2003 |

OTHER PUBLICATIONS

Russian Search Report for Russian Application No. 2021122584 dated Jan. 18, 2022 (4 pages).
$1^{st}$ Office Action for EP Application No. 20747812.4 dated Mar. 1, 2022 (5 pages).
$2^{nd}$ Office Action for EP Application No. 20747812.4 dated Jul. 12, 2022 (5 pages).
$1^{st}$ Office Action for Russian Application No. 2021122584/ dated Jan. 18, 2022 (7 pages).
$1^{st}$ Office Action for Australia Application No. 2020214237 dated Apr. 1, 2022 (3 pages).
$2^{nd}$ Office Action for Australia Application No. 2020214237 dated Aug. 9, 2022 (3 pages).
$1^{st}$ Office Action of India Application No. 202137036521 dated Mar. 15, 2022 (8 pages).
International Search Report for PCT/CN2020/073294 (ISA/CN) dated Mar. 31, 2020 (4 pages).

* cited by examiner

REFRIGERATING AND FREEZING DEVICE

CROSS-REFERENCE TO RELATED APPLICATIONS

The present application is a national phase entry of International Application No. PCT/CN2020/073294, filed Jan. 20, 2020, which claims priority to Chinese Patent Application No. 201920166359.4, filed Jan. 30, 2019, which are incorporated herein by reference in their entirety.

TECHNICAL FIELD

The present invention relates to kitchen appliances, and particularly relates to a refrigerating and freezing device with an electromagnetic wave heating unit.

BACKGROUND ART

In the freezing process of food, the quality of the food is maintained, but the frozen food needs to be thawed before processing or eating. In order to facilitate users freezing and thawing the food, in the prior art, the food is generally thawed by an electromagnetic wave device.

However, when the electromagnetic wave device works, a high-voltage electromagnetic field is formed in a chamber of the electromagnetic wave device, which easily causes potential safety hazards. By comprehensive consideration, a refrigerating and freezing device with a high safety coefficient and with an electromagnetic wave heating unit is required in design.

SUMMARY OF THE INVENTION

An objective of the present invention is to provide a refrigerating and freezing device with a high safety coefficient and with an electromagnetic wave heating unit.

A further objective of the present invention is to avoid damage to electrical components in a container body.

Specifically, the present invention provides a refrigerating and freezing device, including:
  a cabinet, defining at least one storage compartment;
  at least one cabinet door, configured to respectively open and close the at least one storage compartment;
  a refrigerating system, configured to provide cooling capacity to the at least one storage compartment; and
  a heating unit, wherein the heating unit includes:
  a container body, disposed in one of the storage compartments and provided with a pick-and-place opening;
  a door body, disposed at the pick-and-place opening and configured to open and close the pick-and-place opening; and
  an electromagnetic generating system, at least a part of which is disposed in the container body or accessed into the container body, so as to generate electromagnetic waves in the container body to heat an object to be processed; and the refrigerating and freezing device further including:
  a cabinet door detection device, configured to detect open and closed states of the cabinet door corresponding to the storage compartment provided with the container body; and the electromagnetic generating system stopping generating electromagnetic waves when a corresponding cabinet door is in an open state.
  Optionally, the heating unit further includes:
  a door body detection device, configured to detect open and closed states of the door body; and the electromagnetic generating system stopping generating electromagnetic waves when the door body is in an open state.
  Optionally, the pick-and-place opening is formed in a front wall of the container body; and the heating unit further includes:
  a drawer, configured to be slidably connected with two lateral side walls of the container body and fixedly connected with the door body.
  Optionally, the door body detection device is a travel switch disposed at a rear part of the container body and configured to be triggered by a rear wall of the drawer when the door body is in a closed state.
  Optionally, the electromagnetic generating system includes:
  an electromagnetic generating module, configured to generate an electromagnetic wave signal; and
  a radiating antenna, disposed at a bottom of the container body and electrically connected with the electromagnetic generating module so as to generate electromagnetic waves in the container body.
  Optionally, the electromagnetic generating system further includes:
  a signal processing and measurement and control circuit, disposed at the bottom of the container body and located on a rear side of the radiating antenna, and configured to receive electrical signals of the cabinet door detection device and the door body detection device and enable the electromagnetic generating module to stop working when it is detei lined that the corresponding cabinet door is in an open state or the door body is in an open state.
  Optionally, the heating unit further includes:
  a housing, configured to separate an inner space of the container body into a heating chamber and an electrical appliance chamber, the heating chamber being configured to place the object to be processed, and the electrical appliance chamber being configured to place the radiating antenna and the signal processing and measurement and control circuit; wherein
  a rear part of the housing is configured to protrude upward to form an enlarged space below the housing; and
  the door body detection device is fixed to a front wall of an upward protruding part of the housing.
  Optionally, one of the cabinet doors is provided with an interactive module configured to receive a heating start command and transmit the command to the electromagnetic generating system.
  Optionally, the electromagnetic generating system is configured to start generating electromagnetic waves when the corresponding cabinet door and the door body are closed and the heating start command is received.
  Optionally, the refrigerating and freezing device further includes:
  a buzzer, configured to start working when the electromagnetic generating system stops generating electromagnetic waves, so as to prompt a user that heating has stopped.

The refrigerating and freezing device of the present invention detects the open and closed states of the cabinet door corresponding to the storage compartment provided with the electromagnetic wave heating unit through the cabinet door detection device in real time in the process of heating the object to be processed by the heating unit, and enables the electromagnetic generating system to stop generating electromagnetic waves when the cabinet door is opened, which can prevent electromagnetic waves in the heating unit from leaking and affecting the health of a user, thereby improving the safety of the refrigerating and freezing device.

Further, the heating unit of the present invention detects the open and closed states of the door body in real time in the process of heating the object to be processed by disposing the door body detection device, and enables the electromagnetic generating system to stop generating electromagnetic waves when the door body is opened, which can prevent the electromagnetic waves in the heating unit from leaking into the storage compartment to interfere with the operation of other electric appliances, and can realize double protection for the user.

Further, in the present invention, the radiating antenna and the signal processing and measurement and control circuit are covered at the bottom of the container body through the housing, and the object to be processed may be separated from the electric appliances disposed in the container body, thereby preventing the radiating antenna and the circuit from being dirty or damaged by accidental touch.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In figures.

DETAILED DESCRIPTION OF THE INVENTION

Figure 1:
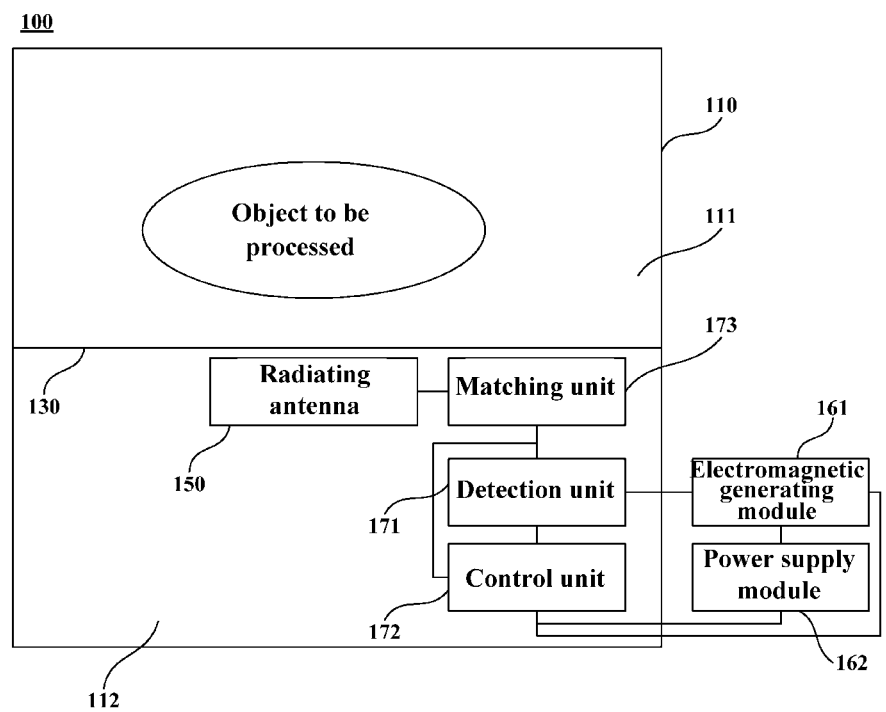
FIG. 1 is a schematic structural diagram of a heating unit according to one embodiment of the present invention.
Figure 2:
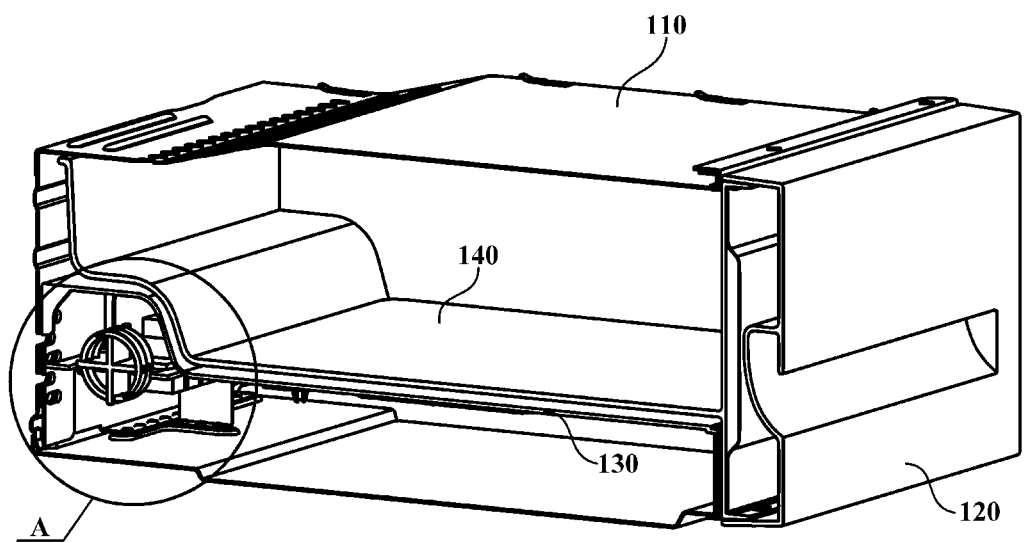
FIG. 2 is a schematic sectional view of the heating unit as shown in FIG. 1, wherein an electromagnetic generating module and a power supply module are removed.

FIG. 1 is a schematic structural diagram of a heating unit 100 according to one embodiment of the present invention. FIG. 2 is a schematic sectional view of the heating unit 100 as shown in FIG. 1, wherein an electromagnetic generating module 161 and a power supply module 162 are removed. Referring to FIG. 1 and FIG. 2, the heating unit 100 may include a container body 110, a door body 120 and an electromagnetic generating system.

The container body 110 may be configured to place an object to be processed, and a front wall or a top wall thereof may be provided with a pick-and-place opening for picking and placing the object to be processed.

The door body 120 may be installed together with the container body 110 by an appropriate method, such as a sliding rail connection, a hinged connection, etc., and is configured to open and close the pick-and-place opening. In an illustrated embodiment, the heating unit 100 further includes a drawer 140 for carrying the object to be processed; a front end plate of the drawer 140 is configured to be fixedly connected with the door body 120, and two lateral side plates of the drawer are movably connected with the container body 110 by sliding rails. The drawer 140 and the door body 120 may be an integrated piece formed by injection molding, or may be pre-assembled into an integrated piece.

The electromagnetic generating system may be disposed such that at least a part thereof is disposed in the container body 110 or accessed into the container body 110, so as to generate electromagnetic waves in the container body 110 to heat the object to be processed in the container body 110.

The container body 110 and the door body 120 may be respectively provided with electromagnetic shielding features, so that the door body 120 is conductively connected with the container body 110 when the door body is in a closed state, so as to prevent electromagnetic leakage.

In some embodiments, the electromagnetic generating system may include an electromagnetic generating module 161, a power supply module 162 and a radiating antenna 150.

The power supply module 162 may be configured to be electrically connected with the electromagnetic generating module 161 to provide electric energy to the electromagnetic generating module 161, so that the electromagnetic generating module 161 generates electromagnetic wave signals. The radiating antenna 150 may be disposed in the container body 110 and is electrically connected with the electromagnetic generating module 161 to generate electromagnetic waves of corresponding frequencies according to the electromagnetic wave signals, so as to heat the object to be processed in the container body 110.

In some embodiments, the container body 110 may be made of metals to serve as a receiving pole to receive electromagnetic waves generated by the radiating antenna 150. In some other embodiments, a side wall of the container body 110 opposite to the radiating antenna 150 may be provided with a receiving pole plate to receive electromagnetic waves generated by the radiating antenna 150.

Figure 4:
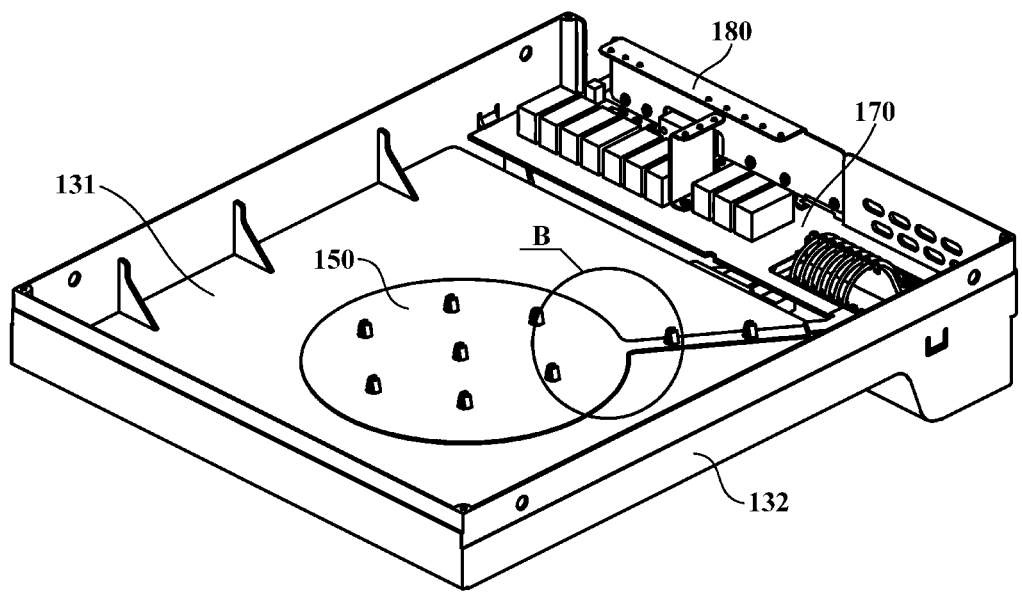
FIG. 4 is a schematic structural diagram of an electrical appliance chamber according to one embodiment of the present invention.
Figure 6:
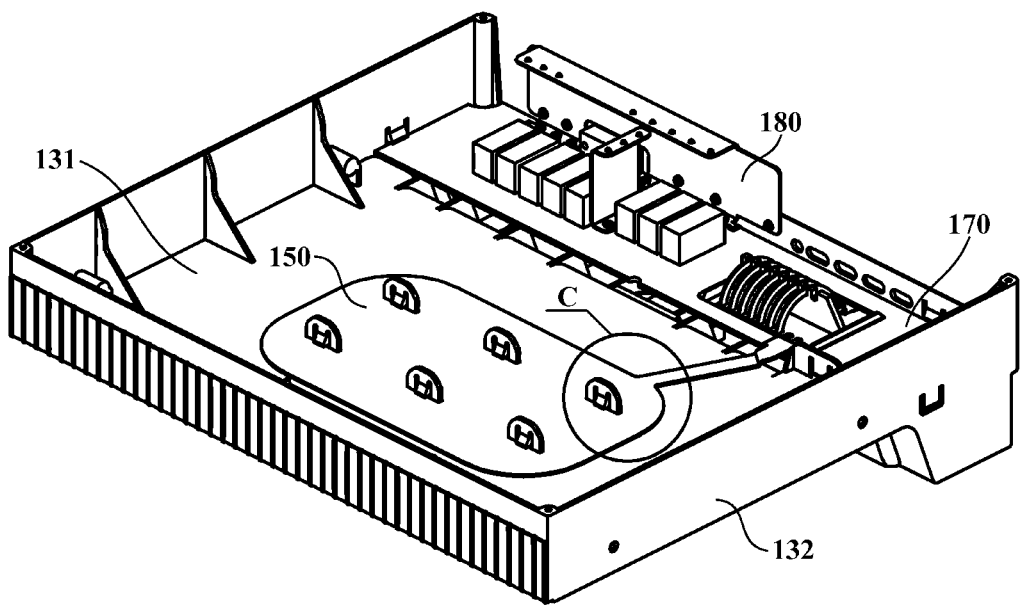
FIG. 6 is a schematic structural diagram of an electrical appliance chamber according to another embodiment of the present invention.

FIG. 4 is a schematic structural diagram of an electrical appliance chamber 112 according to one embodiment of the present invention. FIG. 6 is a schematic structural diagram of the electrical appliance chamber 112 according to another embodiment of the present invention. Referring to FIG. 4 and FIG. 6, the peripheral edge of the radiating antenna 150 may be formed by smooth curves, so as to make the distribution of electromagnetic waves in the container body 110 more uniform, thereby improving the temperature uniformity of the object to be processed. A smooth curve refers to a curve of which the first derivative of the curve equation is continuous, which means that the peripheral edge of the radiating antenna 150 has no sharp corner in engineering.

Referring to FIG. 2 and FIG. 4, the heating unit 100 may further include a housing 130 to separate the inner space of the container body 110 into a heating chamber 111 and the electrical appliance chamber 112. The object to be processed and the radiating antenna 150 may be respectively disposed in the heating chamber 111 and the electrical appliance chamber 112 to separate the object to be processed from the radiating antenna 150, so as to prevent the radiating antenna 150 from being dirty or damaged by accidental touch.

In some embodiments, the housing 130 may be made of an insulating material, so that the electromagnetic waves generated by the radiating antenna 150 may pass through the housing 130 to heat the object to be processed. Further, the housing 130 may be made of a translucent or opaque PP material to reduce the electromagnetic loss of electromagnetic waves at the housing 130, thereby increasing the heating rate of the object to be processed.

The housing 130 may also be configured to fix the radiating antenna 150 to simplify the assembly process of the heating unit 100 and facilitate the positioning and installation of the radiating antenna 150. Specifically, the housing 130 may include a clapboard 131 for separating the heating chamber 111 and the electrical appliance chamber 112, and a skirt part 132 fixedly connected with the inner wall of the container body 110. The radiating antenna 150 may be configured to be fixedly connected with the clapboard 131.

Figure 5:
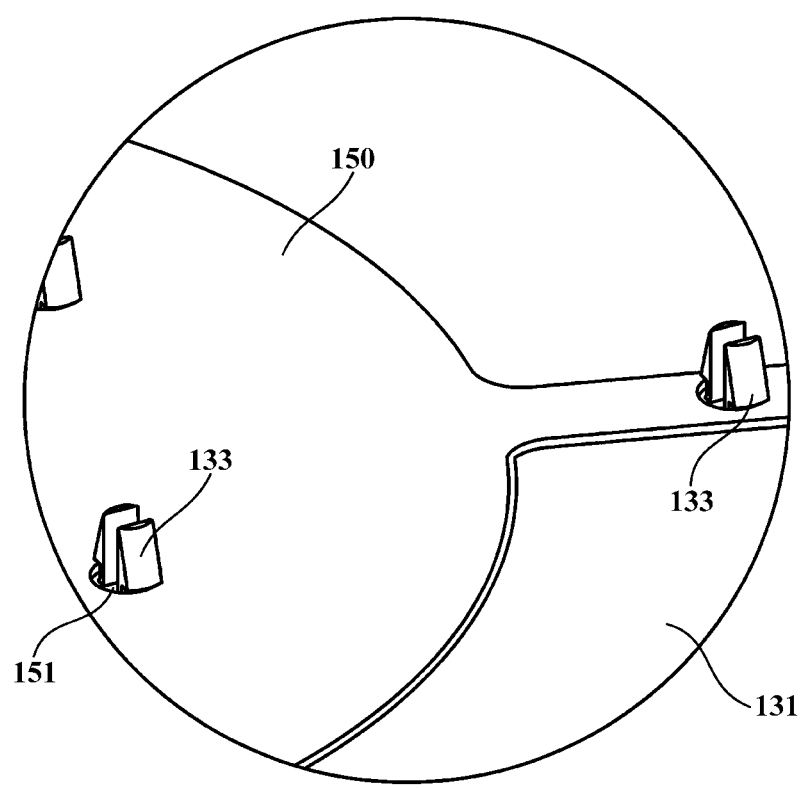
FIG. 5 is a schematic enlarged view of a region B in FIG. 4.

In some embodiments, the radiating antenna 150 may be configured to be engaged with the housing 130. FIG. 5 is a schematic enlarged view of a region B in FIG. 4. Referring to FIG. 5, the radiating antenna 150 may be provided with a plurality of engaging holes 151; the housing 130 may be correspondingly provided with a plurality of buckles 133; and the plurality of buckles 133 are configured to respectively pass through the plurality of engaging holes 151 to be engaged with the radiating antenna 150.

In one embodiment of the present invention, each of the buckles 133 may be composed of two barbs disposed at an interval and in mirror symmetry.

Figure 7:
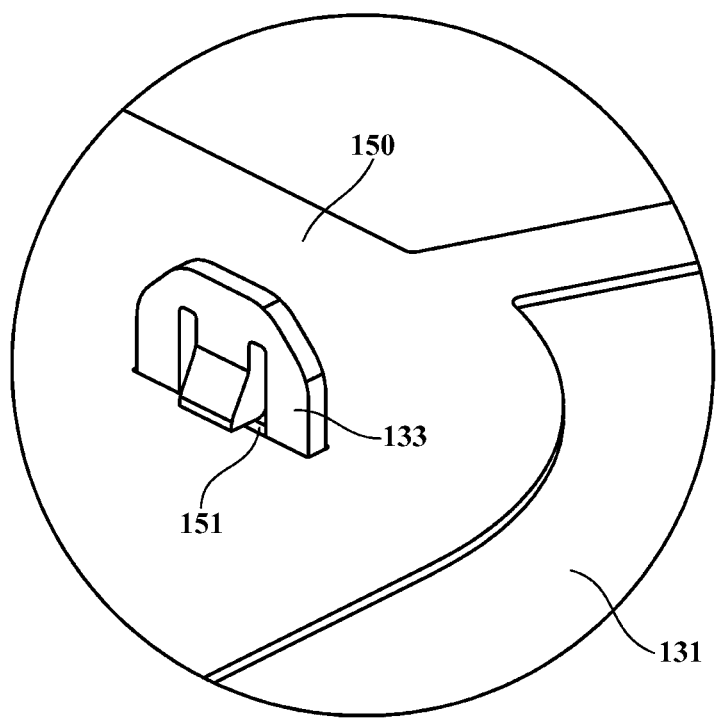
FIG. 7 is a schematic enlarged view of a region C in FIG. 6.

FIG. 7 is a schematic enlarged view of a region C in FIG. 6. Referring to FIG. 7, in another embodiment of the present invention, each of the buckles 133 may be composed of a fixing part perpendicular to the radiating antenna 150 and having a hollow middle part, and an elastic part extending inclining to the fixing part from the inner end edge of the fixing part and toward the antenna.

In some other embodiments, the radiating antenna 150 may be configured to be fixed to the housing 130 by an electroplating process.

The housing 130 may further include a plurality of reinforcing ribs, and the reinforcing ribs are configured to connect the clapboard 131 and the skirt part 132 so as to improve the structural strength of the housing 130.

In some embodiments, the housing 130 may be disposed at the bottom of the container body 110 to avoid the damage to the housing 130 due to the fact that a user places an object to be processed with an excessive height. The radiating antenna 150 may be horizontally fixed on the lower surface of the clapboard 131.

The radiating antenna 150 may be disposed at the height of ⅓ to ½, such as ⅓, ⅖ or ½, of the container body 110, so that the volume of the heating chamber 111 is relatively large, and meanwhile, the electromagnetic waves in the heating chamber 111 have a relatively high energy density so as to make the object to be processed heated quickly.

Figure 3:
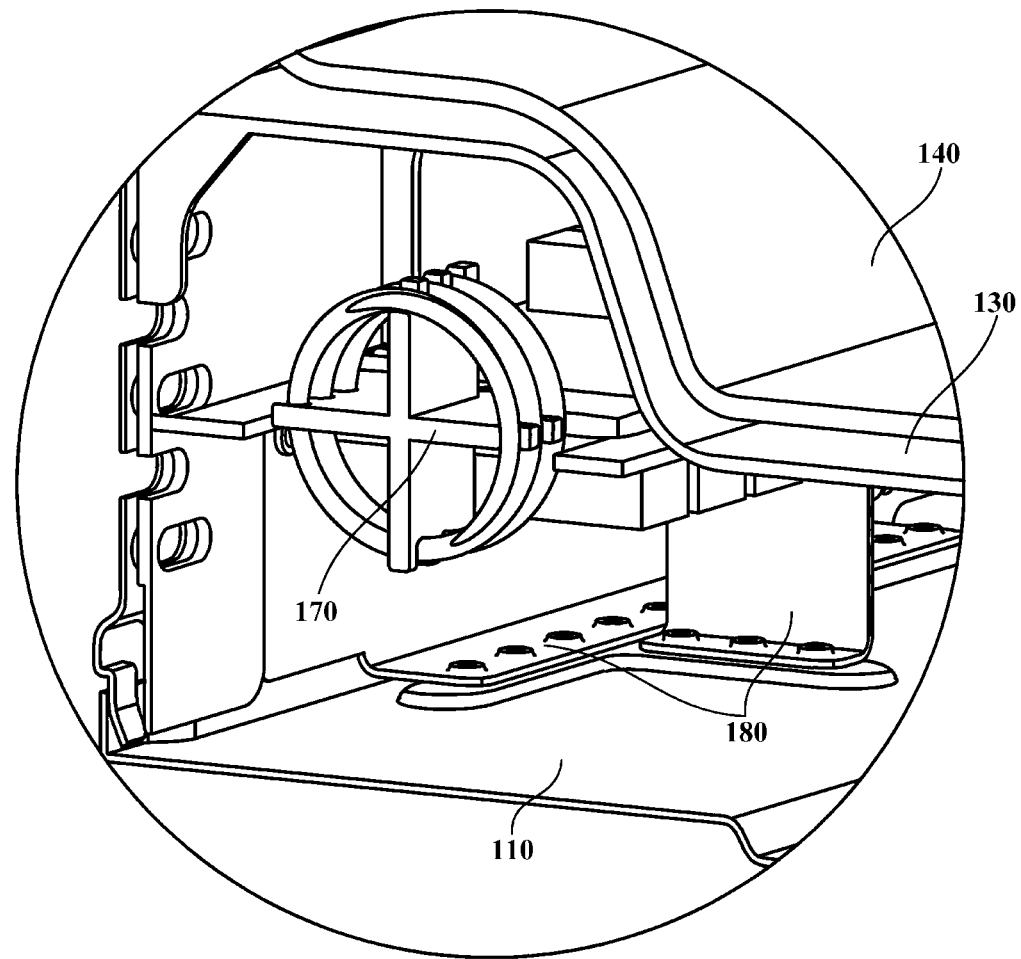
FIG. 3 is a schematic enlarged view of a region A in FIG. 2.

FIG. 3 is a schematic enlarged view of a region A in FIG. 2. Referring to FIG. 1 to FIG. 3, the electromagnetic generating system may further include a signal processing and measurement and control circuit 170. Specifically, the signal processing and measurement and control circuit 170 may include a detection unit 171, a control unit 172 and a matching unit 173.

The detection unit 171 may be connected in series between the electromagnetic generating module 161 and the radiating antenna 150, and is configured to detect in real time the specific parameters of incident wave signals and reflected wave signals passing through the detection unit.

The control unit 172 may be configured to acquire the specific parameters from the detection unit 171, and calculate the power of incident waves and reflected waves according to the specific parameters. In the present invention, the specific parameters may be voltage values and/or current values. Alternatively, the detection unit 171 may be a power meter to directly measure the power of incident waves and reflected waves.

The control unit 172 may further calculate an electromagnetic wave absorption rate of the object to be processed according to the power of incident waves and reflected waves, compare the electromagnetic wave absorption rate with a preset absorption threshold, and send an adjusting command to the matching unit 173 when the electromagnetic wave absorption rate is less than the preset absorption threshold. The preset absorption threshold may be 60% to 80%, such as 60%, 70% or 80%.

The matching unit 173 may be connected in series between the electromagnetic generating module 161 and the radiating antenna 150, and is configured to adjust a load impedance of the electromagnetic generating module 161 according to an adjusting command of the control unit 172, so as to improve the matching degree between the output impedance and the load impedance of the electromagnetic generating module 161, so that when foods with different fixed attributes (such as type, weight and volume) are placed in the heating chamber 111, or during the temperature change of the foods, relatively more electromagnetic wave energy is radiated in the heating chamber 111, thereby increasing the heating rate.

The housing 130 and the container body 110 may be provided with heat dissipation holes respectively in positions corresponding to the matching unit 173, so that the heat generated by the matching unit 173 during working is discharged through the heat dissipation holes.

In some embodiments, the heating unit 100 may be used for thawing. The control unit 172 may also be configured to calculate an imaginary part change rate of a dielectric coefficient of the object to be processed according to the power of incident waves and reflected waves, compare the imaginary part change rate with a preset change threshold, and send a stop command to the electromagnetic generating module 161 when the imaginary part change rate of the dielectric coefficient of the object to be processed is greater than or equal to the preset change threshold, so that the electromagnetic generating module 161 stops working, and the thawing program is terminated.

The preset change threshold may be obtained by testing the imaginary part change rate of the dielectric coefficient of foods with different fixed attributes at −3° C. to 0° C. so that the foods have good shear strength. For example, when the object to be processed is raw beef, the preset change threshold may be set to be 2.

In some embodiments, the signal processing and measurement and control circuit 170 may be integrated on a circuit board and disposed in parallel with the radiating antenna 150 to facilitate the electrical connection between the radiating antenna 150 and a matching module.

In some embodiments, the signal processing and measurement and control circuit 170 may be disposed on the rear side of the radiating antenna 150. The heat dissipation holes may be formed in the rear walls of the housing 130 and the container body 110. The rear part of the housing 130 may be configured to protrude upward to form an enlarged space below the housing.

Figure 8:
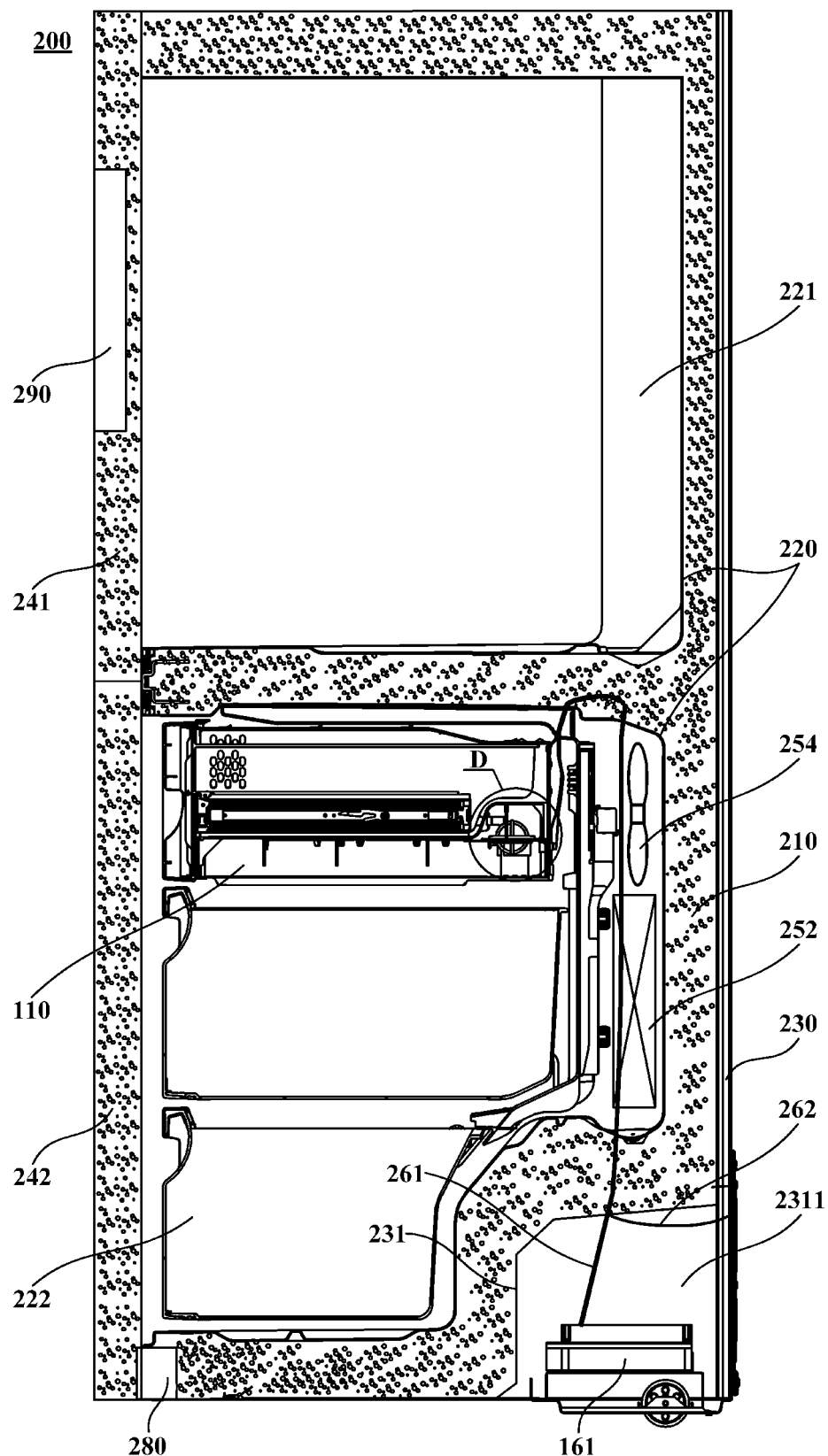
FIG. 8 is a schematic structural diagram of a refrigerating and freezing device according to one embodiment of the present invention.
Figure 9:
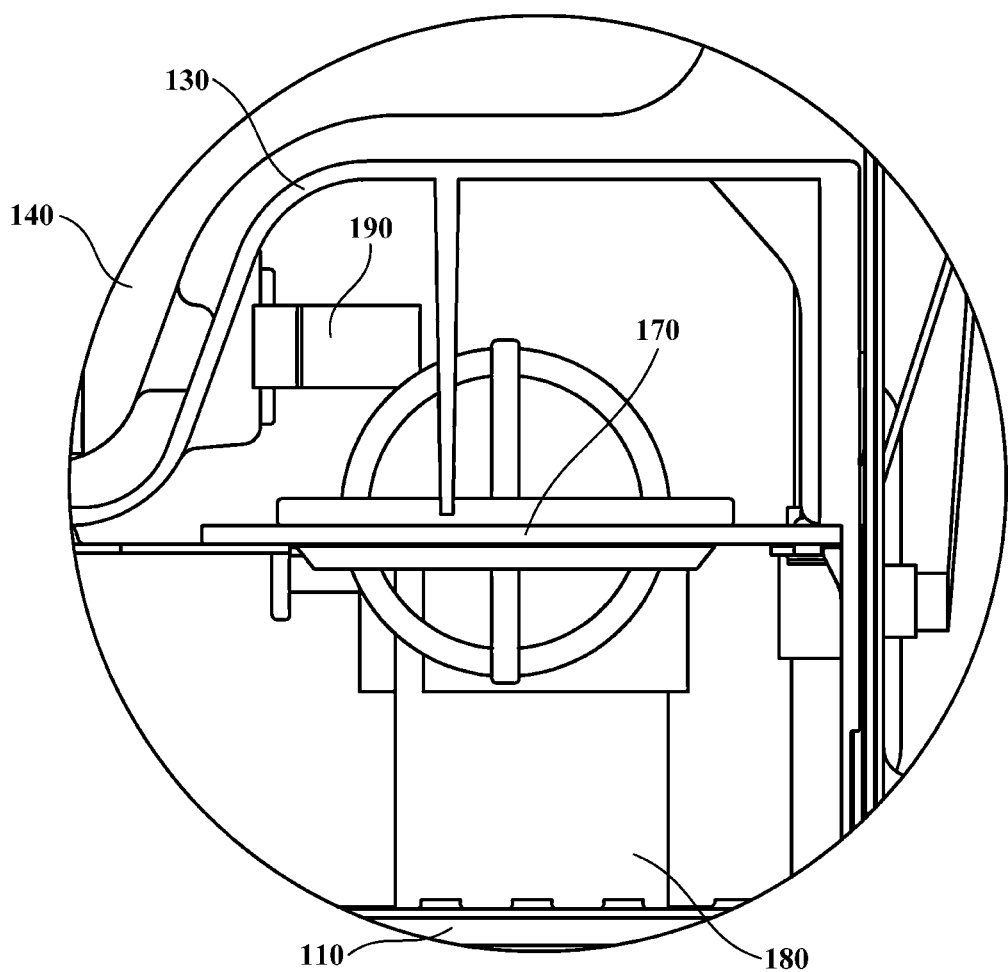
FIG. 9 is a schematic enlarged view of a region D in FIG. 8.

FIG. 9 is a schematic enlarged view of a region D in FIG. 8. Referring to FIG. 9, in some embodiments, the heating unit may further include a door body detection device 190 configured to detect the open and closed states of the door body 120. The door body detection device 190 may perform detection by means of sector switches, magnetically sensitive switches, Hall switches, travel switches, and other various means, and respectively generate different electrical signals when the door body 120 is completely closed or opened, so as to indicate the open and closed states of the door body 120.

The control unit 172 may be configured to be electrically connected with the door body detection device 190 to receive an electrical signal of the door body detection device 190 and judge the open and closed states of the door body 120 according to the electrical signal, and the control unit is configured to send a work stopping command to the electromagnetic generating module 161 when determining that the door body 120 is in an open state, so that the electromagnetic generating module 161 stops generating electromagnetic wave signals to prevent the leakage of electromagnetic waves.

In some embodiments, the door body detection device 190 may be a travel switch fixed to the rear part of the container body 110 and configured to be triggered by the rear wall of the drawer 140 when the door body 120 is in a closed state, and the control unit 172 determines that the door body 120 is in a closed state when the travel switch is triggered.

The door body detection device 190 may be fixed to the front wall of the upward protruding part of the housing 130 to facilitate the electrical connection between the door body detection device 190 and the control unit 172.

In some embodiments, the metal container body 110 may be configured to be grounded to discharge the electric charges thereon, thereby improving the safety of the heating unit 100.

The heating unit 100 may further include a metal bracket 180. The metal bracket 180 may be configured to connect the circuit board and the container body 110 to support the circuit board and discharge the electric charges on the circuit board through the container body 110. In some embodiments, the metal bracket 180 may be composed of two parts perpendicular to each other.

Based on the heating unit 100 according to any one of the above embodiments, the present invention may further provide a refrigerating and freezing device 200. FIG. 8 is a schematic structural diagram of a refrigerating and freezing device 200 according to one embodiment of the present invention. Referring to FIG. 8, the refrigerating and freezing device 200 may include a cabinet defining at least one storage compartment, at least one cabinet door configured to respectively open and close the at least one storage compartment, and a refrigerating system configured to provide cooling capacity to the at least one storage compartment. The container body of the heating unit 100 may be disposed in one storage compartment. In the present invention, at least one means one, two, or more than two. The refrigerating and freezing device 200 may be a refrigerator or a freezer.

In an illustrated embodiment, there are two storage compartments, namely a refrigerating compartment 221 and a freezing compartment 222 disposed under the refrigerating compartment 221. A cabinet door 241 and a cabinet door 242 are respectively configured to open and close the refrigerating compartment 221 and the freezing compartment 222. The container body of the heating unit 100 is disposed in the freezing compartment 222.

The refrigerating system may include a compressor 251, a condenser 253, an evaporator 252, a refrigerating fan 254 for blowing the cooling capacity generated by the evaporator 252 into the freezing compartment 222, and a heat dissipation fan 255 for heat dissipation of the condenser 253.

The cabinet may include an inner liner 220, a shell 230 and an insulating layer 210 disposed between the inner liner 220 and the shell 230. The shell 230 may include two side panels respectively located on two lateral sides of the insulating layer 210, bottom steel 231 located at the bottom of the insulating layer 210, and a back plate located at the rear of the insulating layer 210.

The refrigerating and freezing device 200 further includes a power line (not shown in the figure) for receiving commercial power, so as to supply power to the heating unit 100 and the refrigerating system. The power line may include a grounding wire which is connected with a ground wire in the commercial power and conductively connected with the bottom steel 231, so as to prevent the electric leakage of the refrigerating and freezing device 200.

Figure 10:
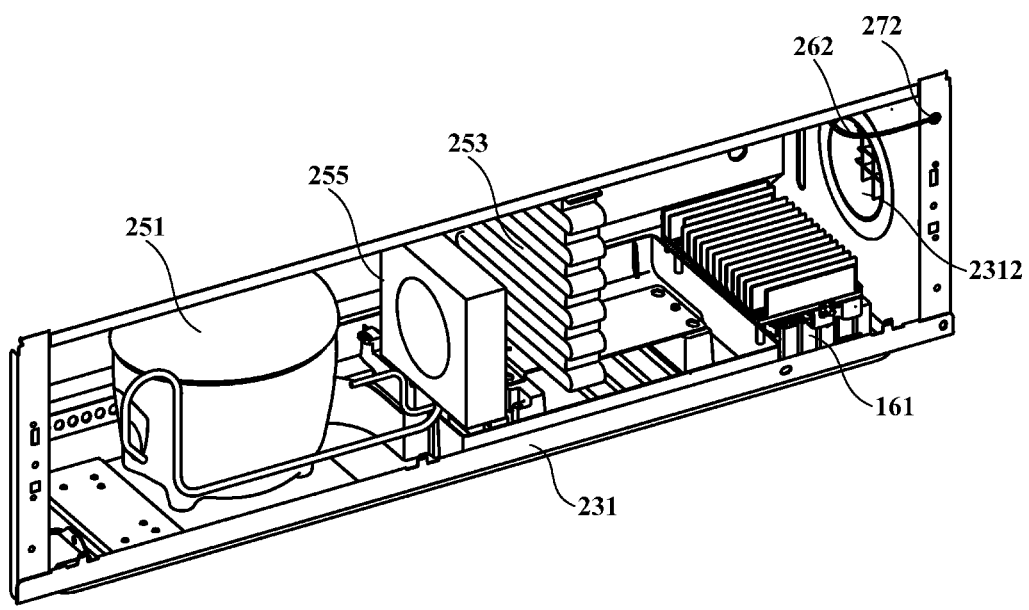
FIG. 10 is a schematic structural diagram of a compressor chamber in FIG. 8.

FIG. 10 is a schematic structural diagram of a compressor chamber 2311 in FIG. 8. Referring to FIG. 10, the bottom steel 231 defines a compressor chamber 2311, and the compressor 251, the condenser 253 and the heat dissipation fan 255 may be disposed in the compressor chamber 2311. Two lateral side walls of the compressor chamber 2311 may be respectively provided with an air vent 2312 to allow ambient air to enter the compressor chamber 2311 to dissipate heat from the condenser 253 and the compressor 251.

In some embodiments, the electromagnetic generating module 161 may be disposed in the compressor chamber 2311 to use the heat dissipation fan 255 to dissipate heat from the electromagnetic generating module 161. A heat dissipation fin may also be disposed in the compressor chamber 2311 and is disposed above the electromagnetic generating module 161 and thermally connected with the electromagnetic generating module 161, so as to increase the heat dissipation area of the electromagnetic generating module 161 and improve the heat dissipation efficiency of the electromagnetic generating module 161.

Figure 11:
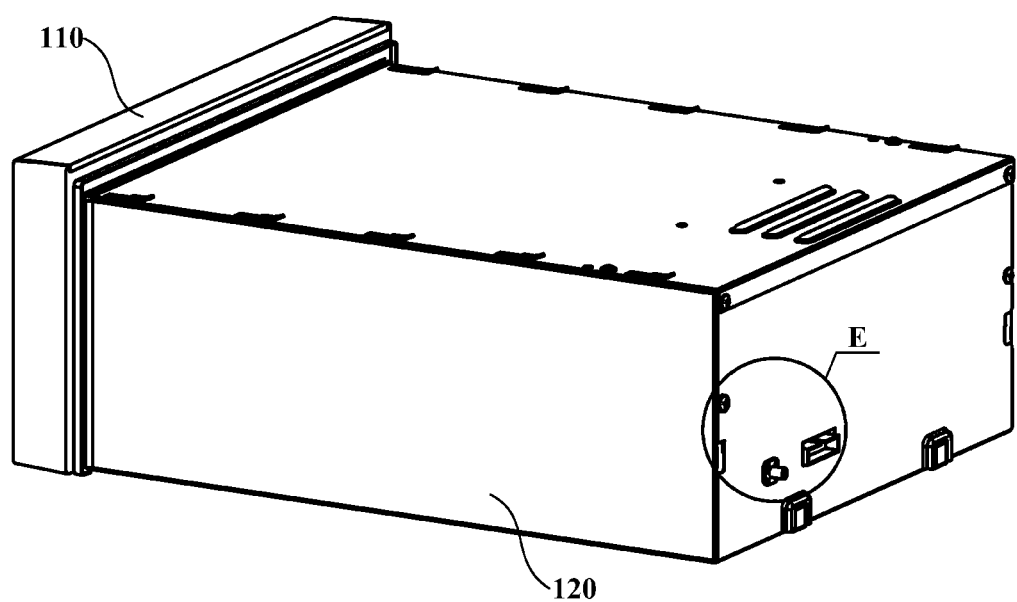
FIG. 11 is a schematic structural diagram of a part of a heating unit located in a storage compartment when viewed from the rear to the front.
Figure 12:
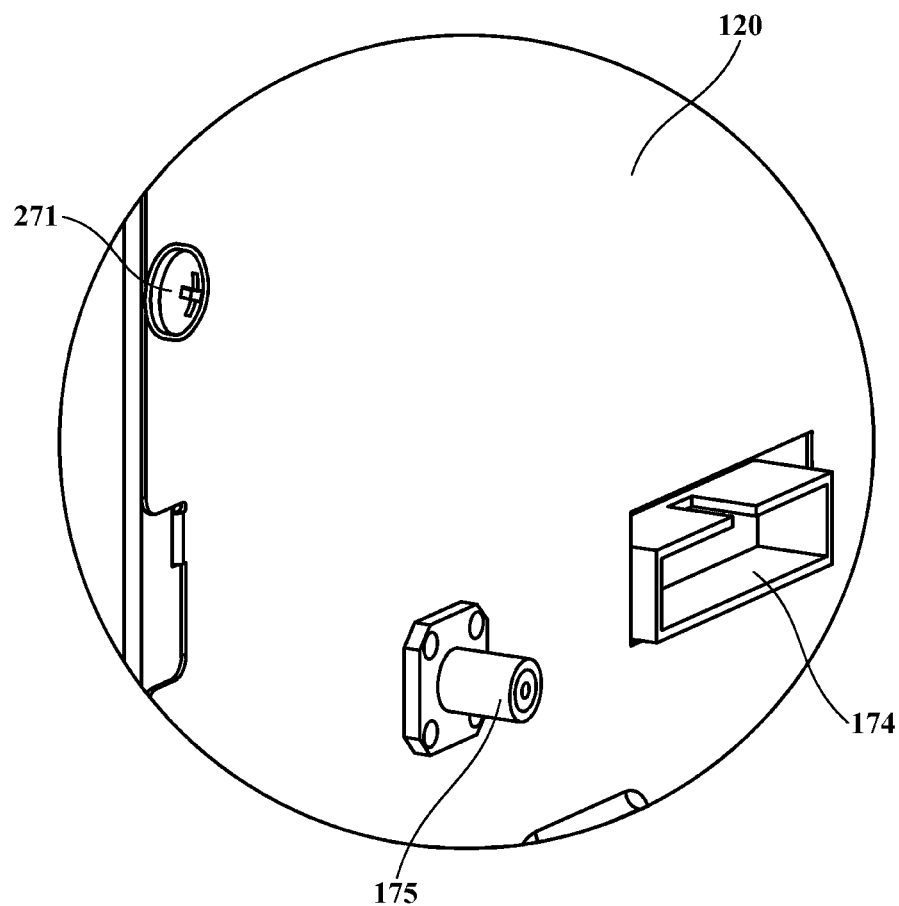
FIG. 12 is a schematic enlarged view of a region E in FIG. 11.

FIG. 11 is a schematic structural diagram of a part of a heating unit located in a storage compartment when viewed from the rear to the front. FIG. 12 is a schematic enlarged view of a region E in FIG. 11. Referring to FIG. 4, FIG. 11 and FIG. 12, a part of the metal bracket 180 may be disposed at the rear part of the circuit board and extend vertically along a lateral direction, and it may be provided with two wiring ports, so that a wiring terminal 175 of the detection unit 171 (or the matching unit 173) and a wiring terminal 174 of the control unit 172 respectively extend out from a wiring port, and are electrically connected with the electromagnetic generating module 161 through a signal transmission wire 261.

Specifically, the container body 110 may be conductively connected with the bottom steel 231 through a lead wire 262 to guide the electric charges thereon to the bottom steel 231 so as to avoid potential safety hazards.

The signal transmission wire 261 and the lead wire 262 may be disposed in the insulating layer 210 in advance, and pass through the inner liner 220 and the bottom steel 231 to respectively reserve wiring terminals in the freezing compartment 222 and the compressor chamber 2311, so that the signal transmission wire 261 and the lead wire 262 may be routed together so as to save the assembly cost.

Two wiring terminals of the lead wire 262 may be conductively connected with the container body 110 and the bottom steel 231 respectively by a fastener 271 and a fastener 272. During assembly, a stable and reliable conductive connection of the lead wire 262 with the container body 110 and the bottom steel 231 can be realized only by tightening the fasteners.

In some embodiments, the control unit 172 may be configured to send a work starting command to the electromagnetic generating module 161 when determining that the door body 120 is in a closed state and a heating start command is received, so that the electromagnetic generating module 161 starts generating electromagnetic wave signals.

The refrigerating and freezing device 200 may further include an interactive module 290 disposed on the cabinet door 241 and configured to receive the heating start command. The control unit 172 may be configured to be electrically connected with the interactive module 290 to receive the heating start command. The control unit 172 is configured to be electrically connected with the power supply module 162 to obtain electric energy from the power supply module 162 and always be in a standby state. Alternatively, the control unit 172 may receive the heating start command through a wireless network.

In some embodiments, the refrigerating and freezing device 200 may further include a cabinet door detection device 280 configured to detect the open and closed states of the cabinet door 242. The cabinet door detection device 280 may perform detection by means of sector switches, magnetically sensitive switches, Hall switches, travel switches, and other various means, and respectively generate different electrical signals when the cabinet door 242 is completely closed or opened, so as to indicate the open and closed states of the cabinet door 242.

In some embodiments, the cabinet door detection device 280 may be configured to be electrically connected with a main control board of the refrigerating and freezing device 200, and the main control board cuts off a power supply circuit of the heating unit 100 or sends a work stopping command to the electromagnetic generating system when determining that the cabinet door 242 is in an open state.

In some other embodiments, the control unit 172 may be configured to be electrically connected with the cabinet door detection device 280 to receive an electrical signal of the cabinet door detection device 280 and judge the open and closed states of the cabinet door 242 according to the electrical signal, and is configured to send a work stopping command to the electromagnetic generating module 161 when determining that the cabinet door 242 is in an open state, so that the electromagnetic generating module 161 stops generating electromagnetic wave signals to prevent the leakage of electromagnetic waves.

The control unit 172 may be further configured to send a work starting command to the electromagnetic generating module 161 when determining that both the cabinet door 242 and the door body 120 are in a closed state and a heating start command is received, so that the electromagnetic generating module 161 starts generating electromagnetic wave signals.

The interactive module 290 may include a buzzer. The control unit 172 may be configured to be electrically connected with the buzzer, and sends a work starting command to the buzzer while sending a work stopping command to the electromagnetic generating module 161, so as to prompt a user that the heating is completed and food materials need to be taken out or the heating is interrupted and needs to be restarted. The buzzer may be configured to alarm every 5 s and stop ala ling until the user takes out the food materials or restarts the heating.

Hereto, those skilled in the art should realize that although multiple exemplary embodiments of the present invention have been shown and described in detail herein, without departing from the spirit and scope of the present invention, many other variations or modifications that conform to the principles of the present invention may still be directly determined or deduced from the contents disclosed in the present invention. Therefore, the scope of the present invention should be understood and recognized as covering all these other variations or modifications.

The invention claimed is:

1. A refrigerating and freezing device, comprising:
   a cabinet, defining at least one storage compartment;
   at least one cabinet door, configured to respectively open and close the at least one storage compartment;
   a refrigerating system, configured to provide cooling capacity to the at least one storage compartment; and
   a heating unit, wherein the heating unit comprises:
   a container body, disposed in one of the storage compartments and provided with a pick-and place opening;
   a door body, disposed at the pick-and-place opening and configured to open and close the pick-and-place opening; and
   an electromagnetic generating system, at least a part of which is disposed in the container body or accessed into the container body, so as to generate electromagnetic waves in the container body to heat an object to be processed; and the refrigerating and freezing device further comprising:
   a cabinet door detection device, configured to detect open and closed states of the cabinet door corresponding to the storage compartment provided with the container body; and the electromagnetic generating system stopping generating electromagnetic waves when a corresponding cabinet door is in an open state;
   wherein the heating unit further comprises a door body detection device, configured to detect open and closed states of the door body; and the electromagnetic generating system stopping generating electromagnetic waves when the door body is in an open state;
   wherein the electromagnetic generating system comprises:
   an electromagnetic generating module, configured to generate an electromagnetic wave signal;
   a radiating antenna, disposed at a bottom of the container body and electrically connected with the electromagnetic generating module so as to generate electromagnetic waves in the container body; and
   a signal processing and measurement and control circuit, disposed at the bottom of the container body and located on a rear side of the radiating antenna, and configured to receive electrical signals of the cabinet door detection device and the door body detection device and enable the electromagnetic generating module to stop working when it is determined that the corresponding cabinet door is in an open state or the door body is in an open state;

wherein the heating unit further comprises a housing configured to separate an inner space of the container body into a heating chamber and an electrical appliance chamber, the heating chamber being configured to place the object to be processed, and the electrical appliance chamber being configured to place the radiating antenna and the signal processing and measurement and control circuit;

wherein a rear part of the housing is configured to protrude upward to form an enlarged space below the housing; and wherein the door body detection device is fixed to a front wall of an upward protruding part of the housing.

2. The refrigerating and freezing device according to claim 1, wherein the pick-and-place opening is formed in a front wall of the container body; and the heating unit further comprises: a drawer, configured to be slidably connected with two lateral side walls of the container body and fixedly connected with the door body.

3. The refrigerating and freezing device according to claim 2, wherein the door body detection device is a travel switch disposed at a rear part of the container body and configured to be triggered by a rear wall of the drawer when the door body is in a closed state.

4. The refrigerating and freezing device according to claim 1, wherein one of the cabinet doors is provided with an interactive module configured to receive a heating start command and transmit the command to the electromagnetic generating system.

5. The refrigerating and freezing device according to claim 4, wherein
the electromagnetic generating system is configured to start generating electromagnetic waves when the corresponding cabinet door and the door body are closed and the heating start command is received.

6. The refrigerating and freezing device according to claim 1, wherein the electromagnetic generating system is configured to start generating electromagnetic waves when the corresponding cabinet door and the door body are closed and a heating start command is received.

7. The refrigerating and freezing device according to claim 1, further comprising: a buzzer, configured to start working when the electromagnetic generating system stops generating electromagnetic waves, so as to prompt a user that heating has stopped.

* * * * *